(12) United States Patent
Hufferd et al.

(10) Patent No.: US 7,577,707 B2
(45) Date of Patent: Aug. 18, 2009

(54) METHOD, SYSTEM, AND PROGRAM FOR EXECUTING DATA TRANSFER REQUESTS

(75) Inventors: John Lewis Hufferd, San Jose, CA (US); Michael Anthony Ko, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 934 days.

(21) Appl. No.: 10/829,914

(22) Filed: Apr. 21, 2004

(65) Prior Publication Data
US 2005/0240941 A1   Oct. 27, 2005

(51) Int. Cl.
| G06F 15/16 | (2006.01) |
| G06F 15/167 | (2006.01) |
| G06F 9/44 | (2006.01) |
| G06F 9/46 | (2006.01) |
| G06F 13/42 | (2006.01) |
| G06F 17/30 | (2006.01) |
| G06F 13/28 | (2006.01) |
| G06F 9/26 | (2006.01) |
| G06F 9/34 | (2006.01) |
| G06F 3/00 | (2006.01) |
| G06F 13/00 | (2006.01) |
| G06F 13/12 | (2006.01) |
| G06F 13/38 | (2006.01) |
| G06F 7/00 | (2006.01) |
| G06F 17/00 | (2006.01) |

(52) U.S. Cl. ............... 709/206; 709/216; 709/236; 709/246; 719/313; 719/326; 710/3; 710/65; 710/105; 711/148; 711/206; 370/395.54

(58) Field of Classification Search .............. 709/206, 709/212, 216, 218, 219, 236, 246, 249; 719/313, 719/321, 326; 710/3, 65, 105; 707/6, 10, 707/104.1; 711/148, 202, 206; 370/389, 370/395.5–395.54
See application file for complete search history.

(56) References Cited

U.S. PATENT DOCUMENTS 5,495,614 A    2/1996   Brent et al.
(Continued)

FOREIGN PATENT DOCUMENTS

JP           10257162         9/1998
(Continued)

OTHER PUBLICATIONS

Krueger, M. et al. "Small Computer Systems Interface Protocol Over the Internet (iSCSI) Requirements and Design Considerations," RFC 3347, Jul. 2002, pp. 1-26.*
(Continued)

*Primary Examiner*—Larry D Donaghue
*Assistant Examiner*—Melvin H Pollack
(74) *Attorney, Agent, or Firm*—David Victor; Konrad Raynes & Victor LLP

(57) ABSTRACT

Provided are a method, system, and program for transferring data between an initiator node and target node. A request is received conforming to a first data transfer protocol at the initiator node to transmit to the target node. A reference to a memory location is obtained to use to transfer the request to the target node. At least one function is called that executes in a user address space of the initiator node, wherein the initiator node includes a kernel address space and the user address space. The at least one function executing in the user address space interfaces with an adaptor to transmit the request and reference to the memory location to the target node using a second data transfer protocol.

27 Claims, 5 Drawing Sheets

U.S. PATENT DOCUMENTS

| | | | |
|---|---|---|---|
| 6,032,224 A | | 2/2000 | Blumenau |
| 6,360,282 B1 | | 3/2002 | Langerman et al. |
| 6,374,248 B1 | | 4/2002 | Nazari |
| 6,490,632 B1 | * | 12/2002 | Vepa et al. ................... 709/250 |
| 6,721,806 B2 | * | 4/2004 | Boyd et al. .................. 719/312 |
| 6,947,970 B2 | * | 9/2005 | Berry .......................... 709/212 |
| 7,003,586 B1 | * | 2/2006 | Bailey et al. ................. 709/250 |
| 7,043,578 B2 | * | 5/2006 | Hufferd ....................... 710/105 |
| 7,089,293 B2 | * | 8/2006 | Grosner et al. .............. 709/217 |
| 7,103,626 B1 | * | 9/2006 | Recio et al. ................... 709/201 |
| 7,103,744 B2 | * | 9/2006 | Garcia et al. ................. 711/170 |
| 7,111,147 B1 | * | 9/2006 | Strange et al. .............. 711/209 |
| 7,171,484 B1 | * | 1/2007 | Krause et al. ............... 709/232 |
| 7,197,588 B2 | * | 3/2007 | Tsao et al. ................... 710/268 |
| 7,231,430 B2 | * | 6/2007 | Brownell et al. ............ 709/218 |
| 7,245,627 B2 | * | 7/2007 | Goldenberg et al. ........ 370/419 |
| 7,263,568 B2 | * | 8/2007 | Shah et al. ................... 710/267 |
| 7,299,266 B2 | * | 11/2007 | Boyd et al. .................. 709/213 |
| 7,350,028 B2 | * | 3/2008 | Cameron et al. ............ 711/135 |
| 7,398,300 B2 | * | 7/2008 | Elzur .......................... 709/212 |
| 7,428,730 B2 | * | 9/2008 | Mountain .................... 717/148 |
| 2002/0029281 A1 | | 3/2002 | Zeidner et al. |
| 2002/0059309 A1 | | 5/2002 | Loy et al. |
| 2002/0059451 A1 | | 5/2002 | Haviv |
| 2002/0095547 A1 | | 7/2002 | Watanabe et al. |
| 2002/0124137 A1 | | 9/2002 | Ulrich et al. |
| 2003/0014544 A1 | | 1/2003 | Pettey |
| 2003/0041211 A1 | | 2/2003 | Merkey et al. |
| 2003/0046396 A1 | | 3/2003 | Richter et al. |
| 2003/0058870 A1 | | 3/2003 | Mizrachi et al. |
| 2003/0061402 A1 | | 3/2003 | Yadav |
| 2003/0067913 A1 | | 4/2003 | Georgiou et al. |
| 2003/0070043 A1 | | 4/2003 | Merkey |
| 2003/0084209 A1 | | 5/2003 | Chadalapaka |
| 2003/0084243 A1 | | 5/2003 | Hoshina et al. |
| 2003/0099254 A1 | | 5/2003 | Richter |
| 2003/0101239 A1 | | 5/2003 | Ishizaki |
| 2003/0131228 A1 | | 7/2003 | Twomey |
| 2003/0135514 A1 | | 7/2003 | Patel et al. |
| 2003/0135692 A1 | | 7/2003 | Noya et al. |
| 2003/0165160 A1 | | 9/2003 | Minami et al. |
| 2003/0169690 A1 | | 9/2003 | Mott |
| 2003/0172169 A1 | | 9/2003 | Cheng |
| 2004/0034725 A1 | * | 2/2004 | Elzur ........................... 710/22 |
| 2004/0073622 A1 | * | 4/2004 | McDaniel et al. ........... 709/212 |
| 2004/0093411 A1 | * | 5/2004 | Elzur et al. .................. 709/224 |
| 2004/0098369 A1 | * | 5/2004 | Elzur ........................... 707/1 |
| 2004/0158651 A1 | * | 8/2004 | Fan et al. ...................... 710/1 |
| 2004/0193833 A1 | * | 9/2004 | Hampton et al. ............ 711/206 |
| 2005/0027868 A1 | * | 2/2005 | Dodson et al. .............. 709/227 |
| 2005/0066046 A1 | * | 3/2005 | Chadalapaka ............... 709/230 |
| 2005/0114455 A1 | * | 5/2005 | Conroy et al. ............... 709/206 |
| 2005/0226248 A1 | * | 10/2005 | Modi et al. ............... 370/395.5 |
| 2005/0240678 A1 | * | 10/2005 | Hufferd et al. .............. 709/246 |

FOREIGN PATENT DOCUMENTS

| | | |
|---|---|---|
| WO | WO 02096028 A1 * | 11/2002 |
| WO | 03/104943 | 12/2003 |

OTHER PUBLICATIONS

Satran, J. et al. "Internet Small Computer Systems Interface (iSCSI)," RFC 3720, Apr. 2004, pp. 1-257.*

Bakke, M. et al. "Internet Small Computer Systems Interface (iSCSI) Naming and Discovery," RFC 3721, Apr. 2004, pp. 1-22.*

Bakke, M. "String Profile for Internet Small Computer Systems Interface (iSCSI) Names," RFC 3722, Apr. 2004, pp. 1-22.*

Chadalapaka, Mallikarjun et al. "A Study of iSCSI Extensions for RDMA (iSER)," Proceedings of the ACM SIGCOMM Workshop on Network-I/O Convergence: Experience, Lessons, Implications, Session: Storage Protocol Designs, 2003, pp. 209-219.*

Recio, Renato John. "Server I/O Networks Past, Present, and Future," Proceedings of the ACM SIGCOMM Workshop on Network-I/O Convergence: Experience, Lessons, Implications, Session: Promises and Reality, 2003, pp. 163-178.*

Callaghan, John et al. "NFS over RDMA," Proceedings of the ACM SIGCOMM Workshop on Network-I/O Convergence: Experience, Lessons, Implications, Session: Storage Protocol Designs, 2003, pp. 196-208.*

Pinkerton, Jim. "The Case for RDMA," Slides from the RDMA Consortium, May 29, 2002, pp. 1-27.*

U.S. Appl. No. 10/340,882, filed Jan. 9, 2003, entitled *Method, System, and Program for Processing a Packet Including I/O Commands and Data*, by J. L. Hufferd, et al.

U.S. Patent Application entitled *Method, System, and Program for Communicating Data Transfer Requests Between Data Transfer Protocols*, filed on Apr. 16, 2004, by J. L Hufferd and M. A. Ko.

Recio, R. "*RDMA enabled NIC (RNIC) Verbs Overview*," pp. 1-28, dated Apr. 29, 2003. Available from http://www.rdmaconsortium.org/home/RNIC_Verbs_Overview2.pdf.

Shah, H., J. Pinkerton, R. Recio and P. Culley. "*Direct Data Placement over Reliable Transports* (Version 1.0 )(draft-shah-iwarp-ddp-v1.0)," pp. 1-35. Release Specification of the RDMA Consortium. Available at http://www.rdmaconsortium.org.

Ko, M., M. Chadalapaka, U. Elzur, H. Shah and P. Thaler. "*iSCSI Extensions for RDMA Specification* (Version 1.0) (draft-ko-iwarp-iser-v1.0)," pp. 1-76. Release Specification of the RDMA Consortium. Available at http://www.rdmaconsortium.org.

Culley, P., U. Elzur, R. Recio, S. Bailey, et al. "*Marker PDU Aligned Framing for TCP Specification* (Version 1.0) (draft-culley-iwarp-mpa-v1.0)," pp. 1-32. Release Specification of the RDMA Consortium. Available at http://www.rdmaconsortium.org.

Abstract for Patent JP 10-257162, Published Sep. 25, 1998, 1 pp.

English Machine Translation for Patent JP 10-257162, Published Sep. 25, 1998, 13 pp.

IDS Information from Japanese Patent Office application, dated Jun. 10, 2008.

Information on Art Applied by Japanese Examiner in Counterpart JP Application, Jun. 20, 2007.

* cited by examiner

METHOD, SYSTEM, AND PROGRAM FOR EXECUTING DATA TRANSFER REQUESTS

BACKGROUND OF THE INVENTION

1. Field of the Invention

The present invention relates to a method, system, and program for executing data transfer requests.

2. Description of the Related Art

In storage environments, data access commands are communicated from a host system to a storage controller, which manages access to the disks. The storage controller may be a card inside the host system or a separate device. The Internet Small Computer Systems Interface (iSCSI) protocol is used for storage networks that utilize Ethernet connections, including Ethernet switches and routers. The term "iSCSI" as used herein refers to the syntax and semantic of the iSCSI protocol defined by the IETF (Internet Engineering Task Force) standards body, and any variant of that protocol. In current storage networks where iSCSI is utilized, the packet configuration comprises an Ethernet package encapsulating an Internet Protocol (IP) and Transmission Control Protocol (TCP) package layers, which further encapsulate an iSCSI package that includes one or more SCSI commands. The Ethernet protocol provides for link-level error checking as the packets flow from point-to-point on any network segment (link) to determine whether data has been corrupted while passing on a link. In network data transmission operations, an initiator device transmits data or commands over the network to a target device. The TCP/IP package includes an error detection code to perform an end-to-end checking to determine at the opposite end whether the transmitted packet has changed during the transmission as the packet passes through switches and routers. A receiving device detecting an error will send a negative acknowledgment to the sending device to request retransmission of those packets in which errors were detected.

The Remote Direct Memory Access (RMDA) protocol provides the capability of one computer to directly place information in another computer's memory with minimal demands on memory bus bandwidth and processor overhead. RDMA over TCP/IP (also known as iWARP) defines the interoperable protocols to support RDMA operations over standard TCP/IP networks. An RDMA Network Interface Card (RNIC) network adaptor card implements the RDMA protocol and performs RDMA operations to transfer data to local and remote memories. Further details of the RDMA protocol are described in the specifications entitled "RDMA Protocol Verbs Specification (Version 1.0)", published by the RDMA Consortium (April, 2003); "Direct Data Placement over Reliable Transports (Version 1.0)", published by RDMA Consortium (October 2002); and "Marker PDU Aligned Framing for TCP Specification (Version 1.0)", published by the RDMA Consortium (October 2002), and which specifications are incorporated herein by reference in their entirety.

One specification entitled "iSCSI Extensions for RDMA Specification (Version 1.0), by Michael Ko et al., released by the RDMA Consortium (July, 2003), which specification is incorporated herein in its entirety, defines a protocol for providing the RDMA data transfer capabilities to iSCSI by layering iSCSI on top of RDMA.

Data transfer systems, including the RDMA and others described above, typically require the intervention of kernel mode processes to handle the read and write operations to and from the storage devices.

BRIEF DESCRIPTION OF THE DRAWINGS

Referring now to the drawings in which like reference numbers represent corresponding parts throughout.

SUMMARY

Provided are a method, system, and program for transferring data between an initiator node and target node. A request is received conforming to a first data transfer protocol at the initiator node to transmit to the target node. A reference to a memory location is obtained to use to transfer the request to the target node. At least one function is called that executes in a user address space of the initiator node, wherein the initiator node includes a kernel address space and the user address space. The at least one function executing in the user address space interfaces with an adaptor to transmit the request and reference to the memory location to the target node using a second data transfer protocol.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
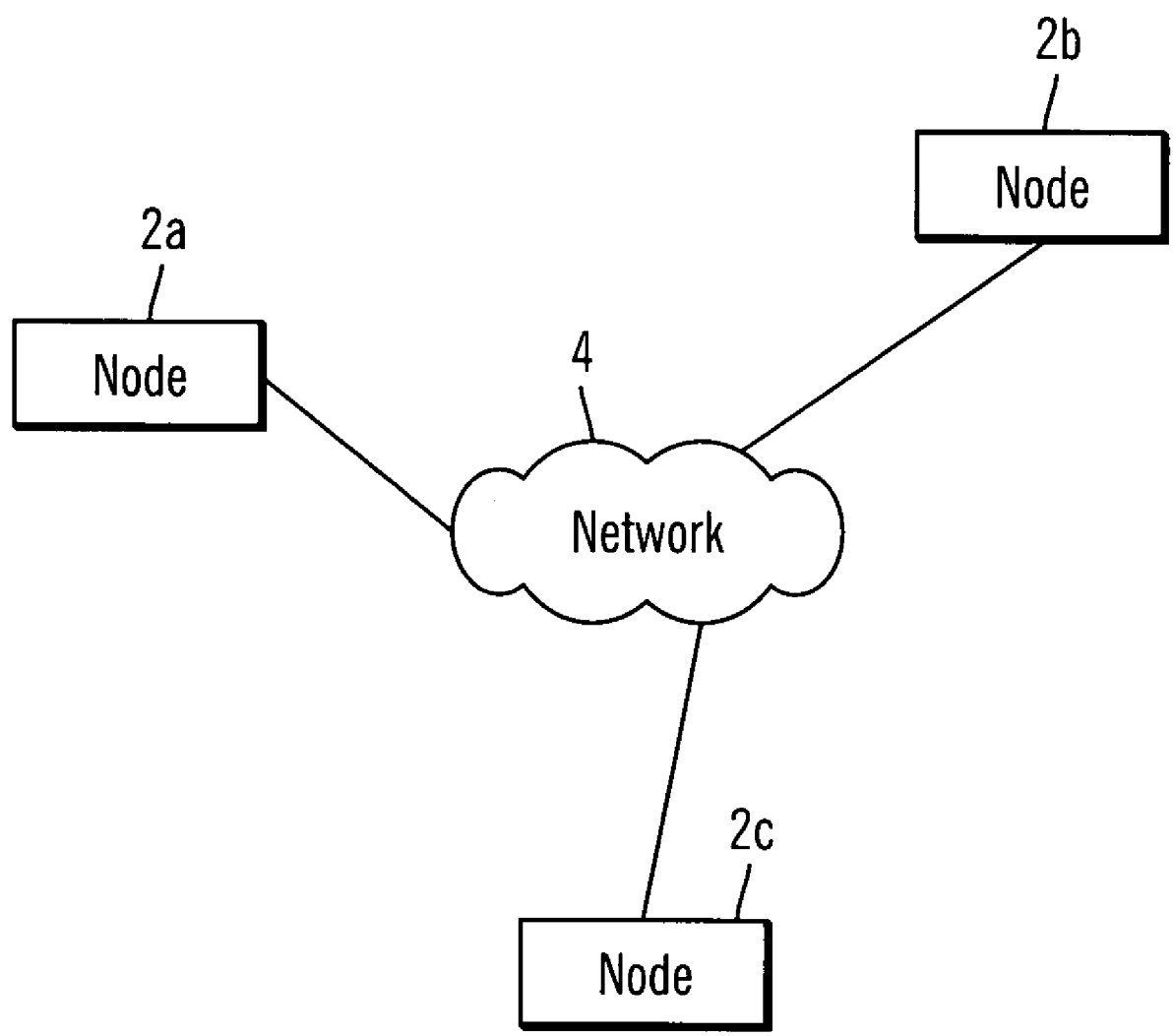
FIG. 1 illustrates an example of network nodes in which embodiments are implemented.

FIG. 1 illustrates a network computing environment comprised of a plurality of computing nodes 2a, 2b . . . 2n that communicate over a network 4. The network may comprise a Local Area Network (LAN), Wide Area Network (WAN), Storage Area Network (SAN). Alternatively, the nodes may communicate over a bus, such a SCSI bus, etc.

Figure 2:
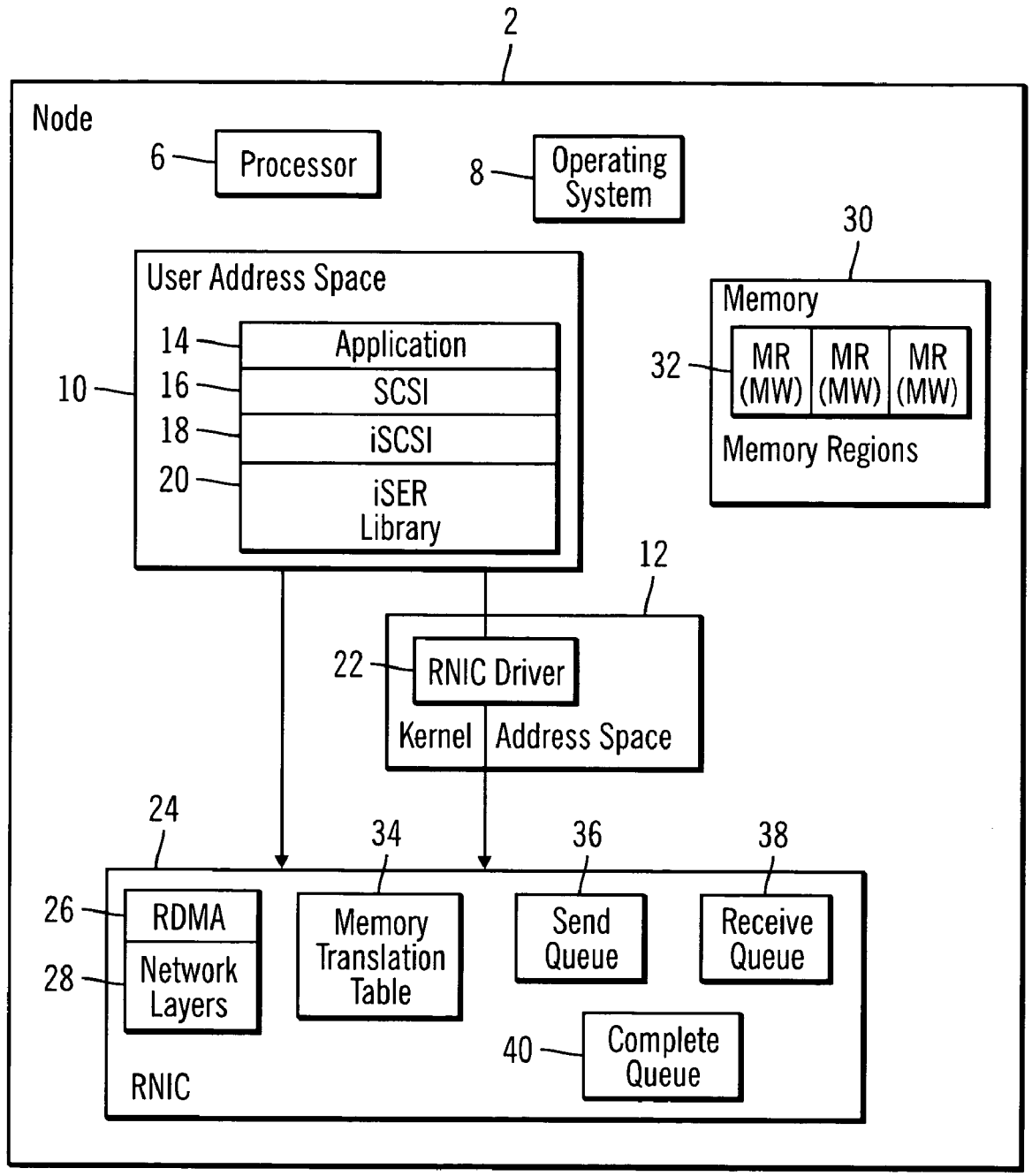
FIG. 2 illustrates an example of a computing architecture in accordance with the described embodiments.

The nodes 2a, 2b . . . 2n in FIG. 1 may operate as both initiators and targets. FIG. 2 illustrates components included in a node, such as nodes 2a, 2b, 2c, to enable communication over the network 4. A node 2 includes a processor 6, such as a central processing unit or complex, and an operating system 8. The operating system 8 provides a user address space 10 and kernel address space 12, where user applications execute in the user address space 10 and essential operations execute in the kernel address space 12, such as resource allocation, low-level hardware interfaces, security, etc.

An application 14 executes in the user space 10, where the application 14 comprises a user application, such as a database program, server program, etc. To perform an I/O operation, the application 14 would make a call to a SCSI layer 16 to generate a protocol data unit (PDU) comprising the I/O request, which in turn would make a call to an iSCSI layer 18, which in turn would call a function from the iSER library 20. Certain functions in the iSER library 20 would call an RNIC driver 22 executing in the kernel space 12, while others will invoke the RNIC directly from the user space 10. A RNIC 24 includes an RDMA layer 26 and network layers 28, such as a TCP layer, IP layer, and Ethernet layer, to package a packet in the transport layer for transmission over the network 4 or unpackage packets received from the network 4.

In certain embodiments, to perform I/O operations, the iSER functions called to handle the I/O request needs to register a memory location in memory 30 to use for the I/O operation. The application 14 may register a memory location, which includes memory regions and memory windows. The RNIC 24 may directly access the registered memory location (locally or locally and remotely) in a logically contiguous fashion. A defined memory location, such as a memory region or memory window, is identified by a steering tag ("STag") created by the RNIC 24 and used to reference the registered memory location. In certain embodiments, a memory region or subset of a memory region referred to as a memory window may be registered, where a separate STag would be associated with each registered memory location (region or window). The RNIC 24 uses the STag to access the referenced memory location. In certain embodiments, the iSER functions in the iSER library would call the RNIC 22 to register the memory regions by calling an RNIC driver 22 executing in the kernel space 12. The RNIC driver 22 comprises the device driver to interface the operating system 8 with the RNIC adaptor 24. In response to the call from the function in the iSER library to declare and register a memory location, e.g., memory region or window, the RNIC driver 22 would call the RNIC 24. The RNIC Driver 22 (also sometimes called the "Verb" layer) along with the RDMA layer 26 in the RNIC 24 pins the memory location to register, such as memory regions (MRs) 32, and generates an STag for the memory region/window.

The RNIC 24 RDMA layer 26 maintains a memory translation table 34, and when registering a memory region/window, would add an entry to the memory translation table 34 identifying the registered memory region and the STag generated to reference that memory region to enable the RNIC 24 to associate the STag with the memory region. The memory translation table 34 may be maintained within buffers in the RNIC 24 or within the memory 30. The STags would be returned to the iSER functions requesting the registration to use for I/O operations.

After the RNIC 24 generates and returns STags to the iSER functions handling the I/O operation, the iSER functions may proceed with the I/O operation. The iSER functions would wrap the packet received from the iSCSI layer 18 with header information and the STag received from the RNIC 24 and pass the packet to the RNIC 24 to transfer. The iSER library 20 functions that interface with the RNIC 24 to perform the RDMA data transfer operation, execute in the user address space 10, thereby bypassing the RNIC driver 22 executing in the kernel space 12.

To manage RDMA data transfers, the RNIC 24 maintains a send queue 36, a receive queue 38, and a complete queue 40. The send queue 36 and receive queue 38 comprise the work queues that the RNIC 24 uses to manage RDMA data transfer requests. The complete queue 40 may comprise a sharable queue containing one or more entries having completion entries to provide a single point of completion notification for multiple work queues. The queues 36, 38, and 40 may be allocated by the RNIC 24 in the memory 30 or within buffers in the RNIC 24.

Figure 3:
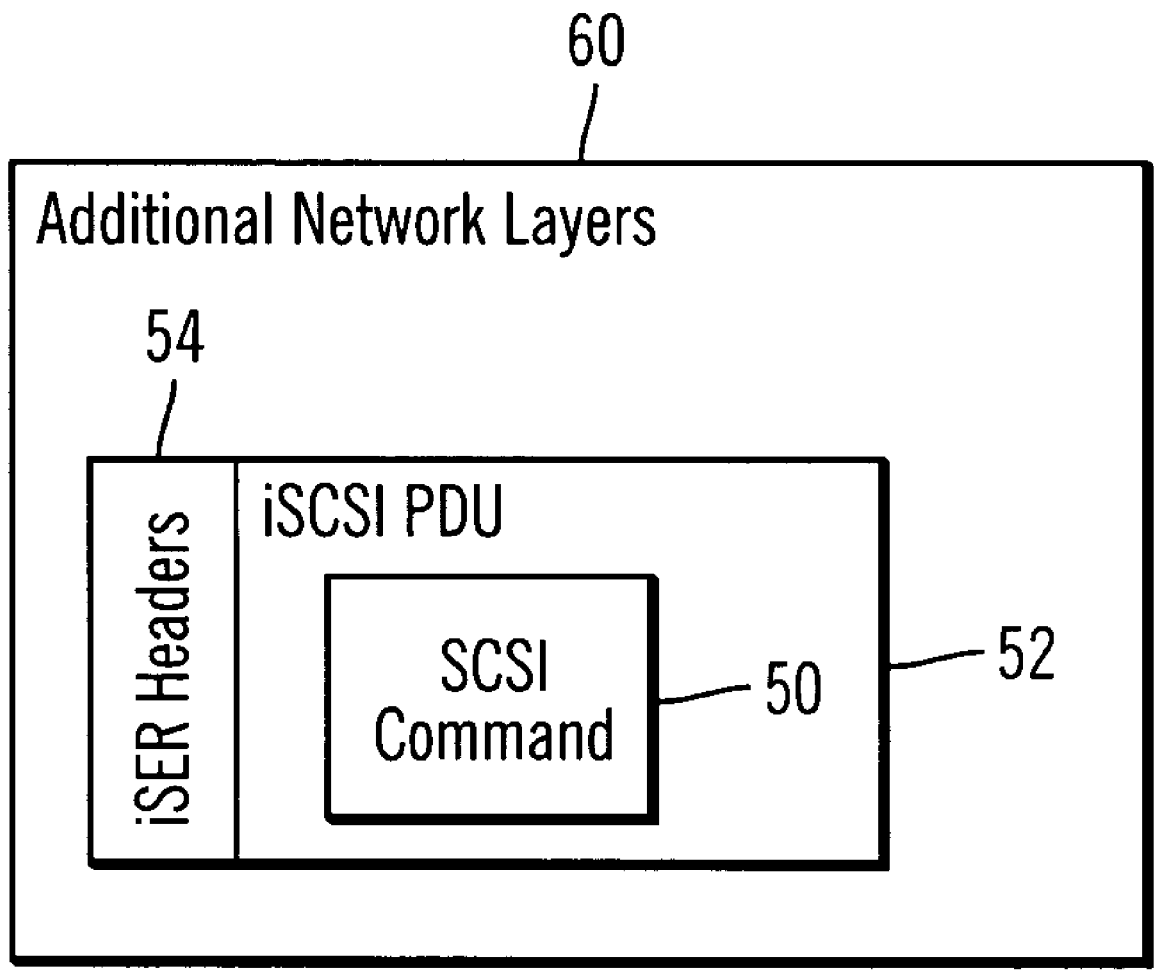
FIG. 3 illustrates a packet format in a manner known in the prior art.

FIG. 3 illustrates the format of a transmitted package used with the embodiments. A SCSI command 50 (such as a read or write command), which is generated by the SCSI layer 16, is encapsulated by the iSCSI layer 18 within an iSCSI protocol data unit (PDU) 52, which is further encapsulated by the functions in the iSER library 20 with an iSER header 54. The iSER header 52 would include the STag and information indicating whether the remote node receiving the advertised STag is to read or write to the memory region (window) referenced by the STag and the work queues related to the request. The iSER encapsulated message 54 is further encapsulated in one or more additional network layers 56, such as a TCP layer, IP layer, and/or Ethernet layer to allow transmission using these additional network protocols. In certain embodiments, the network layers 28 in the RNIC 24 would assemble the iSER encapsulated message 54 within the additional network layers 56, such as TCP, IP, Ethernet, etc.

Figure 4:
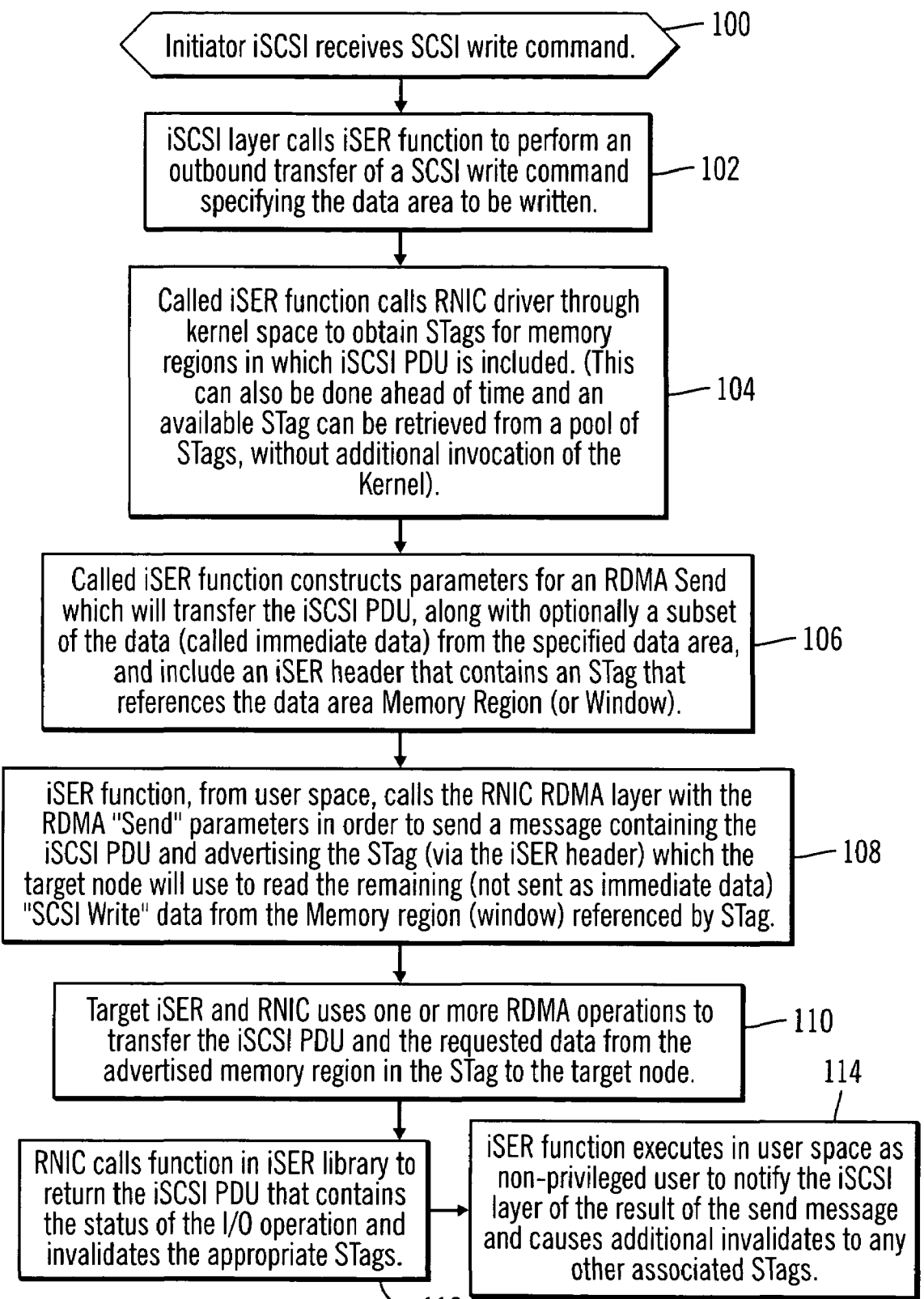
FIGS. 4 and 5 illustrate operations performed to transfer data in accordance with embodiments.
Figure 5:
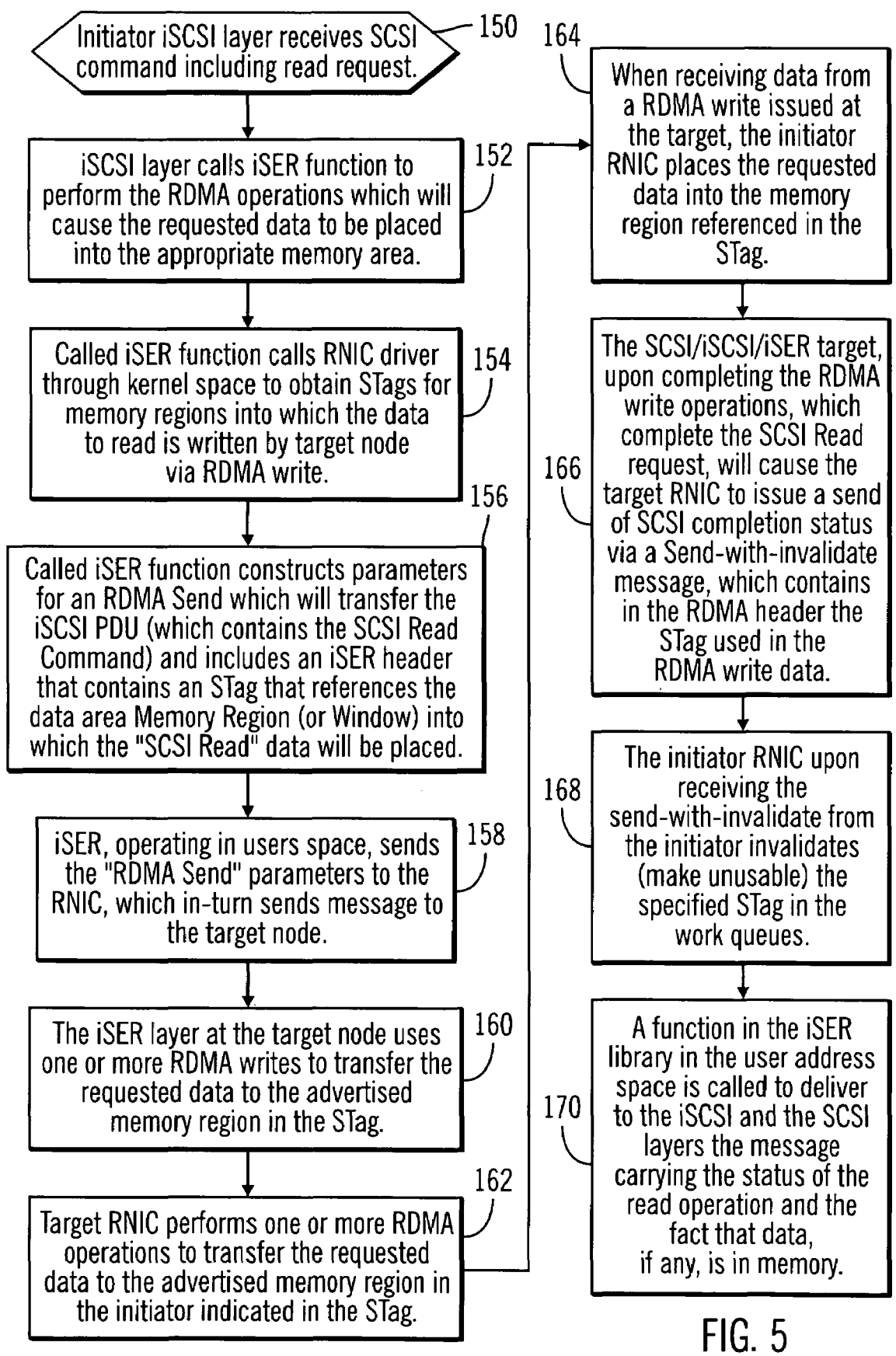

FIGS. 4 and 5 illustrate operations performed within the user space 10 to implement I/O operations. With respect to FIG. 4, upon the initiator iSCSI layer 18 receiving (at block 100) a SCSI write request, the iSCSI layer calls (at block 102) one or more iSERs function from the iSER library 20 to perform an outbound transfer of a SCSI write command including the memory location 30 that contains the data to write to a target node, which may comprise a storage device. The called iSER function calls (at block 104) the RNIC driver 22 in the kernel space 12 to obtain STags for memory regions in which an iSCSI PDU including the received SCSI command is included. The STags may have also been taken from a pool of STags previously registered via kernel 12 calls and thereby bypass the kernel 12 on individual commands. The called iSER function uses (at block 106) the iSCSI PDU pointers (passed to it by the iSER function invocation) to create a Scatter/Gather List (SGL) made up of STags and offsets that describe the iSCSI header, and optional data, as a part of a "Send" request to the RNIC, in order to bypass the kernel address space 12. The iSER function 20, from the user space 10, calls (at block 108) the RNIC RDMA layer 26 to send the composite iSCSI PDU via an RDMA "Send" including an iSER header that advertises (via STags) the memory location 32 to be used by the remote node to extract additional "SCSI write" data, up to the length indicated in the iSCSI PDU. The remote node upon receiving the iSCSI PDU into a memory region in the remote target node, may then process the iSCSI write request using the iSCSI 18 and SCSI 16 layers at the remote target node, which may comprise a storage device. If all the data to be written to the target node was not sent as part of the iSCSI PDU, then the target node will use the STag contained in the iSER header to extract the rest of the data from the initiator node. When called by the iSER function (on the initiator node), the RNIC 24 uses (at block 110) the RDMA 26 and network layers 28 to transfer the message payload to the remote node. The iSER layer at the target may use one or more RDMA operations to extract the requested data from the advertised memory region specified by the STag. After the initiator RNIC receives back from the target node an iSCSI PDU containing the status of the I/O operation the RNIC will invalidate any STag identified in the message to be invalidated. The RNIC 24 may then call (at block 112) a function in the iSER library 20 to return status contained in an iSCSI PDU, where the called iSER function executes (at block 114) in the user space as a non-privileged user to notify the iSCSI layer of the result of sending the message and to invalidate any other associated STags. Further details on the iSCSI/iSER protocol for writing data are found in the publication "iSCSI Extensions for RDMA Specification", which was referenced above.

The target node upon receiving the iSER/iSCSI PDU, unpacks the underlying SCSI write. The target SCSI layer 16 will setup the buffers in memory for the data being written by the initiator and then return a request to the iSCSI layer to begin transmitting data. The target iSCSI layer would then package the request into an iSCSI header. The target iSER layer would intercept the iSCSI request from the target for the data to write and by extracting the STag from the iSER header will be able to issue RDMA Read commands that will cause the referenced data to be read from the Initiators memory. In certain embodiments, the target node iSER/RDMA calls may be entirely or partially included in the kernel address space. (Key of invention is initiator has to use the user space for the iSER, iSCSI, and SCSI functions.) After writing all the data from the initiator, the SCSI/iSCSI process on the target builds a Status PDU which describes the completion status of the SCSI operation, and uses iSER to send the PDU to the Initiator via an RDMA "Send-with-Invalidate" message (which contains the STag to be invalidated.)

FIG. 5 illustrates operations performed at a node to read data from a remote location. Upon the initiator iSCSI layer 18 receiving (at block 150) the SCSI read command, the iSCSI layer 18 calls (at block 152) the iSER function to send the iSCSI PDU containing the SCSI Read command to the remote node. The called iSER function calls (at block 154) the RNIC driver 22 in the kernel space 12 to obtain STags for memory regions 32 in which the iSCSI/iSER PDU headers are to be extracted, and the location into which the "SCSI Read" data, from the remote target node, is to be placed. The STags may have also been taken from a pool of STags previously registered via kernel 12 calls and thereby bypass the kernel address space 12 on individual commands. The called iSER function includes in its iSER header STags which advertise (at block 156) the memory region in which the data is to be written by including the STag as part of the iSER header 52 in a packet having the iSCSI PDU containing the read request to cause the target node to write the requested data specified in the SCSI read request packaged within the iSCSI PDU to the memory region 32 referenced by the advertised STag. The initiator RNIC 24 operating in user address space sends (at block 158) the message to the target node. The iSER layer at the target node uses (at block 160) one or more RDMA writes to transfer the requested data to the advertised memory region in the initiator node referenced in the STag. The iSER/iSCSI/SCSI layer at the target node may execute in the user address space 10 or kernel 12 address space. In response to the iSER layer, the target RNIC RDMA layer performs (at block 162) the RDMA writes to transfer the requested data with a message payload specifying the STag that was advertised in the requesting iSCSI/iSER PDU. When receiving data from a RDMA write issued at the target, the initiator RNIC 24 places (at block 164) the requested data into the memory region referenced in the STag. The SCSI/iSCSI/iSER target, upon completing the RDMA write operations, which complete the SCSI Read request, invokes (at block 166) the target RNIC to issue a send of SCSI completion status via a Send-with-invalidate message, which contains in the RDMA header the STag used in the RDMA write data. The initiator RNIC 24 upon receiving (at block 168) the send-with-invalidate from the initiator invalidates (make unusable) the specified STag in the work queues, and then calls (at block 170) a function in the initiator's iSER library 20 in the user address space 10 to deliver the iSCSI PDU which contains the I/O status message which in turn will be delivered by iSCSI layer 18 to the SCSI layer 16 which also indicates that the returned data requested by the read is in memory 30. Further details on the iSCSI/iSER protocol for reading data are found in the publication "iSCSI Extensions for RDMA Specification", which was referenced above.

FIGS. 4 and 5 illustrate how an iSCSI layer may call functions in an iSER library through the user space 10 as a non-privileged user to communicate directly with the RNIC 24 to perform RDMA related operations without having to make calls to the RNIC driver 22 in the kernel space. In certain embodiments, after memory regions are allocated and STags obtained by iSER functions through the kernel space 10, RDMA read and write operations to implement iSCSI read and write operations are called through the user space 10, thereby avoiding the need to call the RNIC driver 22 through the kernel space 12. Avoiding the kernel address space for processing I/O requests reduces burdens on the node processor because calls through the kernel space 12 place greater resource allocation burdens on the system than calls through the user space 10. Thus, I/O operations proceed through processes executing in the user address space, thereby avoiding the kernel address space.

In the described operations, the iSCSI layer 18 called functions in the iSER library 20. In alternative embodiments, other layers, such as the SCSI layer 16 or application 14, may build their own iSCSI PDUs and call the iSER layer 20 to implement SCSI read and write requests through RDMA calls made through the iSER library 20. Likewise, some applications may contain the function of the SCSI layer within their own code.

Further, the iSCSI layer 18 may invoke additional types of RDMA operations than those described above through calls to the iSER library 20 that are made through the user space 10, without the need to call the RNIC driver 22 executing in the kernel space 12. Yet further, the RNIC may return status and other information by invoking functions in the iSER library 20 executed in the user space 10, to return the status and messages to the iSCSI layer 18 without going through the kernel space 12.

Additional Embodiment Details

The embodiments described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In described embodiments, the iSER layer was used to implement the RDMA transfer capabilities through the user space 10 to perform iSCSI read and write operations. In additional embodiments, the iSCSI layer may invoke the iSER layer to perform RDMA transfer operations to perform operations other than read and write operations, such as for providing status, messages, etc.

In the described implementations, the physical layer utilized the Ethernet protocol. In alternative implementations, alternative protocols providing link-to-link checksumming/CRC (or other data protection techniques) of the packet may be used instead of Ethernet, such as Serial Advanced Technology Attachment (SATA), Infiniband, serial attached SCSI cable, etc.

In described implementations, the transport layer comprised the iSCSI protocol. In alternative implementations other protocols known in the art for transmitting I/O commands in packets and providing end-to-end checksumming/CRC (or other data protection techniques) may be used.

In the described implementations, the packaged I/O commands comprised SCSI commands. In alternative implementations, the commands may be in different I/O command formats than SCSI, such as Advanced Technology Attachment (ATA) commands.

In described embodiments, the iSCSI layer made calls to the iSER layer to access the RDMA data transfer capabilities through the user space. In additional embodiments, data transfer protocol layers other than iSCSI executing in the user space, such as an application or other data transfer protocols, may call the iSER layer directly to access RDMA data transfer capabilities.

FIGS. 4 and 5 describe specific operations occurring in a particular order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for transferring data between an initiator node and target node, comprising:

receiving, in the initiator node, a request conforming to a first data transfer protocol at the initiator node to transmit to the target node;

obtaining, in the initiator node, a reference to a memory location to use to transfer the request to the target node;

calling, in the initiator node, at least one function that executes in a user address space of the initiator node, wherein the initiator node includes a kernel address space and the user address space;

interfacing, in the initiator node, by the at least one function executing in the user address space, with an adaptor at the initiator node to provide parameters and the memory location to the adaptor; and transmitting, by the adaptor, the request and reference to the memory location to the target node using a second data transfer protocol.

2. The method of claim 1, wherein the reference to the memory location is obtained by calling an adaptor driver in the kernel address space.

3. The method of claim 1, wherein the adaptor initializes the reference to the memory location to use for data transfer.

4. The method of claim 1, wherein the at least one function is part of a library of functions used to invoke operations using the second data transfer protocol, further comprising:

calling, by the adaptor, at least one function in the library that executes in the user address space to communicate status to a first data transfer protocol layer that invoked the call to the at least one function.

5. The method of claim 1, wherein the request comprises an Input/Output (I/O) request and wherein the memory location is used to implement the I/O request.

6. The method of claim 5, wherein the response written to the memory location conforms with the first data transfer protocol and is processed by a first data transfer layer protocol executing in the user address space of the initiator node.

7. The method of claim 5, wherein the I/O request comprises a write request to write data included in the request, further comprising:

encapsulating, in the initiator node, the write request in a packet with the reference to the memory location including the data to write, wherein the target node uses the reference to the memory location transmitted to the target node by the adaptor at the initiator node to read the data to write from the memory location in the initiator node using the second data transfer protocol.

8. The method of claim 5, wherein the I/O request comprises a read request to read data from the target node, and wherein the target node writes the requested data to the memory location.

9. The method of claim 1, wherein the first data transfer protocol comprises the iSCSI protocol and wherein the request is generated by an iSCSI layer executing in the user address space in the initiator node, wherein the second data transfer protocol comprises the RDMA data transfer protocol, wherein the at least one function that interfaces with the adaptor comprises an iSER function, and wherein the adaptor comprises an RNIC adaptor.

10. An article of manufacture including code implemented in an initiator node for transferring data between the initiator node and target node, wherein the initiator node includes an adaptor, a kernel address space and an user address space; wherein the code is executed to cause operations, the operations comprising:

receiving a request conforming to a first data transfer protocol at the initiator node to transmit to the target node;

obtaining a reference to a memory location to use to transfer the request to the target node;

calling at least one function that executes in a user address space of the initiator node, wherein the initiator node includes a kernel address space and the user address space;

interfacing, by the at least one function executing in the user address space, with the adaptor at the initiator node to provide parameters and the memory location to the adaptor, wherein the adaptor transmits the request and reference to the memory location to the target node using a second data transfer protocol.

11. The article of manufacture of claim 10, wherein the reference to the memory location is obtained by calling an adaptor driver in the kernel address space.

12. The article of manufacture of claim 10, wherein the adaptor initializes the reference to the memory location to use for data transfer.

13. The article of manufacture of claim 10, wherein the at least one function is part of a library of functions used to invoke operations using the second data transfer protocol, wherein the adaptor calls at least one function in the library that executes in the user address space to communicate status to a first data transfer protocol layer that invoked the call to the at least one function.

14. The article of manufacture of claim 10, wherein the request comprises an Input/Output (I/O) request and wherein the memory location is used to implement the I/O request.

15. The article of manufacture of claim 14, wherein the response written to the memory location conforms with the first data transfer protocol and is processed by a first data transfer layer protocol executing in the user address space of the initiator node.

16. The article of manufacture of claim 14, wherein the I/O request comprises a write request to write data included in the request, wherein the operations further comprise:

encapsulating the write request in a packet with the reference to the memory location including the data to write, wherein the target node uses the reference to the memory location transmitted to the target node by the adaptor at the initiator node to read the data to write from the memory location in the initiator node using the second data transfer protocol.

17. The article of manufacture of claim 14, wherein the I/O request comprises a read request to read data from the target node, and wherein the target node writes the requested data to the memory location.

18. The article of manufacture of claim 10, wherein the first data transfer protocol comprises the iSCSI protocol and wherein the request is generated by an iSCSI layer executing in the user address space in the initiator node, wherein the second data transfer protocol comprises the RDMA data transfer protocol, wherein the at least one function that interfaces with the adaptor comprises an iSER function, and wherein the adaptor comprises an RNIC adaptor.

19. A system in communication with a target node, comprising:
memory including a plurality of memory locations;
a kernel address space;
a user address space;
an adaptor; and
a computer readable medium including code executed to perform operations, the operations comprising:
receiving a request conforming to a first data transfer protocol at the initiator node to transmit to the target node;
obtaining a reference to a memory location to use to transfer the request to the target node;
calling at least one function that executes in a user address space of the initiator node, wherein the initiator node includes a kernel address space and the user address space;
interfacing by the at least one function executing in the user address space with the adaptor to provide parameters and the memory location to the adaptor; and
wherein the adaptor transmits the request and reference to the memory location to the target node using a second data transfer protocol.

20. The system of claim 19, wherein the reference to the memory location is obtained by calling an adaptor driver in the kernel address space.

21. The system of claim 19, wherein the adaptor initializes the reference to the memory location to use for data transfer.

22. The system of claim 19, wherein the at least one function is part of a library of functions used to invoke operations using the second data transfer protocol, wherein the adaptor calls at least one function in the library that executes in the user address space to communicate status to a first data transfer protocol layer that invoked the call to the at least one function.

23. The system of claim 19, wherein the request comprises an Input/Output (I/O) request and wherein the memory location is used to implement the I/O request.

24. The system of claim 23, wherein the response written to the memory location conforms with the first data transfer protocol and is processed by a first data transfer layer protocol executing in the user address space of the initiator node.

25. The system of claim 23, wherein the I/O request comprises a write request to write data included in the request, wherein the operations further comprise:

encapsulating the write request in a packet with the reference to the memory location including the data to write, wherein the target node uses the reference to the memory location transmitted to the target node by the adaptor at the initiator node to read the data to write from the memory location in the initiator node using the second data transfer protocol.

26. The system of claim 23, wherein the I/O request comprises a read request to read data from the target node, and wherein the target node writes the requested data to the memory location.

27. The system of claim 19, wherein the first data transfer protocol comprises the iSCSI protocol and wherein the request is generated by an iSCSI layer executing in the user address space in the initiator node, wherein the second data transfer protocol comprises the RDMA data transfer protocol, wherein the at least one function that interfaces with the adaptor comprises an iSER function, and wherein the adaptor comprises an RNIC adaptor.

* * * * *

UNITED STATES PATENT AND TRADEMARK OFFICE
CERTIFICATE OF CORRECTION

PATENT NO. : 7,577,707 B2
APPLICATION NO. : 10/829914
DATED : August 18, 2009
INVENTOR(S) : Hufferd et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1204 days.

Signed and Sealed this

Seventh Day of September, 2010

David J. Kappos
*Director of the United States Patent and Trademark Office*